UNITED STATES PATENT OFFICE.

HERRENSTEIN COURTEILLE, OF NEW YORK, N. Y., ASSIGNOR, BY MESNE ASSIGNMENTS, TO THE TRIUMPH PATENT SAFETY POWDER COMPANY, OF BALTIMORE, MARYLAND.

IMPROVEMENT IN BLASTING-POWDER.

Specification forming part of Letters Patent No. 167,503, dated September 7, 1875; reissue No. 7,068, dated April 18, 1876; application filed March 28, 1876.

*To all whom it may concern:*

Be it known that I, HERRENSTEIN COURTEILLE, of the city, county, and State of New York, have invented a new and useful Improvement in the Manufacture of Blasting-Powder; and I do hereby declare the following to be a full, clear, and exact description of the same.

The chief aim and purpose of my invention is to produce a powder for blasting, which, while having great dynamic power, (which I graduate for mining purposes,) shall possess the quality of being non-explosive in the open air or by concussion or friction, and at the same time be manufactured at a greatly reduced cost. To this end the essential principle of my invention consists in mixing a comparatively large volume of the elements of common gunpowder with a small volume of such other elements as will, under the proper conditions, combine with the nitrogen, oxygen, and sulphur of the gunpowder to form nitro-glycerine, or the equivalent thereof, the nitro-glycerine elements remaining chemically uncombined as nitro-glycerine until the mixture is exploded in a close chamber or under pressure.

In carrying this invention into practice, I employ the following ingredients, to wit: nitrate of soda or saltpeter, sulphur, and charcoal, which form the base or large proportion of "gunpowder elements" above referred to, and the oils or fats of animals, or tar of any kind, which unite with the nitrates and sulphur to form the comparatively small nitro-glycerine element; or combination of nitric or nitric and sulphuric acids with the elements of common tar, and also a small quantity of peat, metallic sulphates, and hard coal, to expedite the process and insure the best results.

While the proportions of these things may be slightly varied, yet experiment has shown that the following have proven the best for the purpose, varying from the maximum to the minimum, according to the strength desired. For manufacturing one hundred pounds, the proportions will be: nitrate of soda or saltpeter, sixty to seventy pounds; sulphur, ten to twelve pounds; charcoal, seven to ten pounds; peat and hard coal, nine to twelve pounds; combined metallic sulphates, two to four pounds; and oleaginous matter, animal or vegetable, refined or crude, one to three pounds. Tar in any form will answer the purpose of such oily matter. All the solid matters are pulverized and mixed together with the metallic sulphates, and with moisture sufficient to thoroughly saturate them at a temperature of about 250° Fahrenheit. The moisture I consider to be best applied by subjecting the materials in an open vessel to the direct action of steam until they are thoroughly saturated. With this I combine the action of external heat, using superheated steam on account of its safety, the vessel being provided with a double bottom for that purpose.

The temperature should not be raised so high as to liquefy the sulphur, for the reason that the latter will then form independent globules, and the process will be impaired, if not altogether defeated; but it should be kept as high as it can without melting the sulphur, it being best if graduated so as to soften the sulphur, and render it sticky or pasty, the minimum of moisture being that which will dissolve the nitrates, and the maximum of heat being that which will soften, but not liquefy, the sulphur. The result will be a perfect incorporation of the materials, and by prolonging the external heat about thirty minutes after the direct application of the steam ceases the liquids will evaporate, and the compound become dry.

During the evaporation of the liquids the temperature of the heating element in the double bottom is slowly reduced from 250° to 150° Fahrenheit, in order to insure perfect safety during the drying process.

When nearly dry, I take the mass out and put it on a drying-platform, of metal, heated by steam or hot air, and under this action for about fifteen minutes the powder is ready for packing.

I claim as my invention—

1. The improved safety blasting-powder, containing the elements of common gunpowder and also the uncombined elements of nitro-glycerine, substantially as described.

2. The process of manufacturing an explosive compound by treating the components of ordinary gunpowder in the presence of oleaginous or tarry matters, peat, and metallic sulphates, substantially as and for the purposes set forth.

HERRENSTEIN COURTEILLE.

Witnesses:

TH. G. STEWART,

OTTO BENNER.